United States Patent
Nuzman et al.

(10) Patent No.: US 10,038,473 B2
(45) Date of Patent: Jul. 31, 2018

(54) METHODS AND SYSTEMS FOR REDUCING CROSSTALK VIA STABILIZED VECTORING CONTROL

(71) Applicants: Carl J. Nuzman, Union, NJ (US); Danny Van Bruyssel, Murray Hill, NJ (US)

(72) Inventors: Carl J. Nuzman, Union, NJ (US); Danny Van Bruyssel, Murray Hill, NJ (US)

(73) Assignee: Alcatel Lucent, Boulogne-Billancourt (FR)

(*) Notice: Subject to any disclaimer, the term of this patent is extended or adjusted under 35 U.S.C. 154(b) by 0 days.

(21) Appl. No.: 14/609,657

(22) Filed: Jan. 30, 2015

(65) Prior Publication Data

US 2016/0226556 A1 Aug. 4, 2016

(51) Int. Cl.
- *H04B 3/32* (2006.01)
- *H04B 3/06* (2006.01)
- *H04B 3/487* (2015.01)

(52) U.S. Cl.
CPC ................ *H04B 3/32* (2013.01); *H04B 3/06* (2013.01); *H04B 3/487* (2015.01)

(58) Field of Classification Search
CPC ............ H04B 3/32; H04B 3/487; H04B 3/06
See application file for complete search history.

(56) References Cited

U.S. PATENT DOCUMENTS

| | | | | |
|---|---|---|---|---|
| 6,885,746 B2 * | 4/2005 | Hausman | .......... | H04B 3/23 370/201 |
| 8,218,419 B2 | 7/2012 | Kramer et al. | | |
| 8,243,578 B2 | 8/2012 | Kramer et al. | | |
| 8,730,785 B2 * | 5/2014 | Starr | .......... | H04B 3/32 370/201 |
| 9,654,172 B2 * | 5/2017 | Wang | .......... | H04B 3/32 |
| 2007/0263711 A1 * | 11/2007 | Theodor Kramer | ...... | H04L 5/14 375/222 |
| 2008/0043928 A1 * | 2/2008 | Zhou | .......... | H04B 3/487 379/22.04 |
| 2009/0073868 A1 * | 3/2009 | Guenach | .......... | H04L 27/2601 370/201 |

(Continued)

FOREIGN PATENT DOCUMENTS

EP 2755333 A1 7/2014

OTHER PUBLICATIONS

Muller, F. C. B. F., et al., "Optimizung Power Normalization for G.fast Linear Precoder by Linear Programming," 2014 IEEE International Conference on Communications, pp. 4160-4165, Jun. 10, 2014.

*Primary Examiner* — Lisa Hashem
(74) *Attorney, Agent, or Firm* — Harness, Dickey & Pierce, P.L.C.

(57) ABSTRACT

In one example embodiment, a method includes obtaining a crosstalk channel and a channel matrix and determining a power controlling matrix, the power controlling matrix for regulating powers corresponding to a plurality of active communication lines. The method further includes determining a vectoring matrix based on applying the power controlling matrix to the crosstalk channel and generating vectored signals using the vectoring matrix for communication of data over the plurality of active communication lines.

24 Claims, 5 Drawing Sheets

(56) References Cited

U.S. PATENT DOCUMENTS

| | | | |
|---|---|---|---|
| 2009/0092036 A1* | 4/2009 | Peeters | H04B 3/32 370/201 |
| 2012/0106315 A1* | 5/2012 | Chow | H04B 3/32 370/201 |
| 2012/0140901 A1* | 6/2012 | Tennyson | H04M 3/306 379/27.01 |
| 2012/0195183 A1* | 8/2012 | Nuzman | H04B 7/0848 370/201 |
| 2012/0320959 A1* | 12/2012 | Lu | H04B 3/32 375/224 |
| 2013/0215940 A1* | 8/2013 | Cendrillon | H04B 3/32 375/222 |
| 2013/0301824 A1* | 11/2013 | Defoort | H04B 3/32 379/406.01 |
| 2014/0119419 A1* | 5/2014 | Strobel | H04B 3/32 375/224 |
| 2014/0153629 A1* | 6/2014 | Gao | H04M 11/062 375/227 |
| 2014/0169489 A1* | 6/2014 | Eriksson | H04B 3/32 375/260 |
| 2014/0226454 A1* | 8/2014 | Lu | H04B 3/32 370/201 |
| 2014/0226538 A1* | 8/2014 | Wang | H04J 11/0036 370/277 |
| 2015/0195005 A1* | 7/2015 | De Lind Van Wijngaarden | H04M 3/302 370/201 |
| 2015/0229354 A1* | 8/2015 | Nuzman | H04B 3/487 375/257 |
| 2015/0244418 A1* | 8/2015 | Verbin | H04B 3/32 370/201 |
| 2015/0326278 A1* | 11/2015 | Maes | H04B 3/32 370/201 |
| 2015/0350415 A1* | 12/2015 | Nuzman | H04M 3/34 379/406.01 |
| 2016/0043786 A1* | 2/2016 | Maes | H04B 3/32 375/260 |
| 2016/0049990 A1* | 2/2016 | Lv | H04B 3/32 370/201 |
| 2016/0119025 A1* | 4/2016 | Strobel | H04M 11/062 370/201 |
| 2016/0164621 A1* | 6/2016 | Tsiaflakis | H04J 3/10 379/406.04 |
| 2016/0197646 A1* | 7/2016 | Lv | H04B 3/32 370/201 |
| 2016/0285528 A1* | 9/2016 | Wang | H04B 1/525 |
| 2016/0286037 A1* | 9/2016 | Emad | H04M 3/34 |
| 2016/0329978 A1* | 11/2016 | Zukunft | H04B 3/32 |

* cited by examiner

METHODS AND SYSTEMS FOR REDUCING CROSSTALK VIA STABILIZED VECTORING CONTROL

BACKGROUND

Performance of a digital subscriber line (DSL) in terms of capacity depends on a number of factors such as attenuation and a noise environment. Performance of a DSL transmission system is impacted by crosstalk interference from one twisted line pair to another twisted line pair with the same binder and, to a lesser extent, twisted line pairs in neighboring binders.

Consequently, crosstalk interference may affect data rates across a number of twisted pair lines.

For instance two communication lines such as two very-high-bitrate digital subscriber line (VDSL2) lines which are collocated next to each other induce a signal in each other. Due to the induced crosstalk and noise from other sources in the surroundings of the communication line, the data transported on these lines may be affected or corrupted by the crosstalk and noise. By reducing the crosstalk induced on a communication line or compensating the crosstalk induced on a communication line, the amount of corrupted data may be reduced and the rate at which information can be reliably communicated is increased.

Existing solutions for reducing crosstalk and noise include utilizing a pre-coding control mechanism, which has an optimal performance for crosstalk channel matrices that are diagonally dominant.

Pre-coding (also referred to as pre-compensation) techniques are based on transmitting an additional signal added to the data signal which is used to compensate for the crosstalk on a victim line from external sources. Thus, instead of reducing the effect of crosstalk or avoiding crosstalk effects by configuring the communication line in an appropriate way, pre-coding can be used to compensate for the effects of crosstalk on a communication channel. Pre-coding techniques are based on crosstalk channel information that includes both amplitude and phase information. Such information can be obtained from measurements such as slicer error or signal-to-noise ratio (SNR). A particular example of such measurements for pre-coding is the use of pilot sequences and error feedback. The use of pilot sequences in G.vector is described in "Self-FEXT cancellation (vectoring) for use with VDSL2 transceivers," *Series G: Transmission Systems and Media, Digital Systems and Networks, ITU G.993.5*, April 2010, the entire contents of which is incorporated by reference.

A crosstalk channel matrix may refer to a matrix that indicates levels of noise and crosstalk interference induced by each active communication line on other active communication lines (in the case of the two communication lines discussed above, the corresponding crosstalk matrix is a 2 by 2 matrix).

A diagonally dominant matrix is a matrix in which a magnitude of a diagonal entry in each row of the matrix is greater than or equal to a sum of the magnitudes of all other entries in the same row of that matrix.

SUMMARY

Example embodiments are directed to methods and systems for reducing crosstalk in DSL systems with high levels of crosstalk.

According to one example embodiment, a method includes obtaining a crosstalk channel and a channel matrix and determining a power controlling matrix, the power controlling matrix for regulating powers corresponding to a plurality of active communication lines. The method further includes determining a vectoring matrix based on applying the power controlling matrix to the crosstalk channel and generating vectored signals using the vectoring matrix for communication of data between a plurality of remote transceivers and at least one device over the plurality of active communication lines.

In an example embodiment, the channel matrix is a non-diagonally dominant matrix.

In an example embodiment, the vectoring matrix is a diagonally dominant matrix.

In an example embodiment, the method includes determining the power controlling matrix such that a measure of strength of a product of the power controlling matrix and the crosstalk channel is less than a threshold, wherein the vectoring matrix is a pre-coding matrix and the crosstalk channel is a downstream crosstalk channel.

In an example embodiment, the power controlling matrix is a diagonal matrix, entries of the diagonal matrix corresponding to a portion of the active communication lines are less than 1, and entries of the diagonal matrix corresponding to a remaining portion of the plurality of active communication lines are equal to 1.

In an example embodiment, the method includes constraining the powers corresponding to the portion of the active communication lines.

In an example embodiment, the method includes determining the power controlling matrix by iteratively updating diagonal entries of the power controlling matrix.

In an example embodiment, the iterative updating of the diagonal entries of the power controlling matrix includes determining an initial compensation matrix subject to a threshold. For each iteration of the iterative updating, the iterative updating of the diagonal entries includes determining an error matrix based on a corresponding compensation matrix, determining, for each row of the corresponding compensation matrix, a row power, determining the diagonal entries of the power controlling matrix based on each determined row power, and updating the corresponding compensation matrix based on the determined power controlling matrix, the updated compensation matrix being used as a compensation matrix for a next iteration in the iterative updating.

In an example embodiment, the method includes determining the power controlling matrix such that a measure of strength of a product of the power controlling matrix and the crosstalk channel is less than a threshold, wherein the vectoring matrix is a post-coding matrix and the crosstalk channel is an upstream crosstalk channel.

In an example embodiment, the power controlling matrix is a diagonal matrix, entries of the diagonal matrix corresponding to a portion of the plurality of active communication lines are less than 1, and entries of the diagonal matrix corresponding to a remaining portion of the plurality of active communication lines are equal to 1.

In an example embodiment, the method includes constraining the powers corresponding to the portion of the active communication lines.

In an example embodiment, a device includes a processor configured to obtain a crosstalk channel and a channel matrix and determine a power controlling matrix, the power controlling matrix for regulating powers corresponding to a plurality of active communication lines. The processor is further configured to determine a vectoring matrix based on applying the power controlling matrix to the crosstalk channel and generating vectored signals using the vectoring matrix for communication of data between a plurality of remote transceivers and the device over the plurality of active communication lines.

In an example embodiment, the channel matrix is a non-diagonally dominant matrix.

In an example embodiment, the vectoring matrix is a diagonally dominant matrix.

In an example embodiment, the processor is configured to determine the power controlling matrix such that a measure of strength of a product of the power controlling matrix and the crosstalk channel is less than a threshold, wherein the vectoring matrix is a pre-coding matrix and the crosstalk channel is a downstream crosstalk channel.

In an example embodiment, the power controlling matrix is a diagonal matrix, entries of the diagonal matrix corresponding to a portion of the active communication lines are less than 1, and entries of the diagonal matrix corresponding to a remaining portion of the plurality of active communication lines are equal to 1.

In an example embodiment, the processor is configured to constrain the powers corresponding to the portion of the active communication lines.

In an example embodiment, processor is configured to determine the power controlling matrix by iteratively updating diagonal entries of the power controlling matrix.

In an example embodiment, the processor is configured to iteratively update the diagonal entries of the power controlling matrix by determining an initial compensation matrix subject to a threshold. For each iteration of the iterative updating, the processor is configured to determine an error matrix based on a corresponding compensation matrix, determine, for each row of the corresponding compensation matrix, a row power, determine the diagonal entries of the power controlling matrix based on each determined row power, and update the corresponding compensation matrix based on the determined power controlling matrix, the updated compensation matrix being used as a compensation matrix for a next iteration in the iterative updating.

In an example embodiment, the processor is configured to determine the power controlling matrix such that a measure of a product of the power controlling matrix and the crosstalk channel is less than a threshold, wherein the vectoring matrix is a post-coding matrix and the crosstalk channel is an upstream crosstalk channel.

In an example embodiment, the power controlling matrix is a diagonal matrix, entries of the diagonal matrix corresponding to a portion of the plurality of active communication lines are less than 1, and entries of the diagonal matrix corresponding to a remaining portion of the plurality of active communication lines are equal to 1.

In an example embodiment, the processor is configured to constrain the powers corresponding to the portion of the active communication lines.

BRIEF DESCRIPTION OF THE DRAWINGS

Example embodiments will be more clearly understood from the following detailed description taken in conjunction with the accompanying drawings.

FIG. 1 illustrates a communication system, according to an example embodiment;

FIG. 2 illustrates a controller including a pre-coder, according to an example embodiment;

FIG. 3 describes a process for determining a power controlling matrix, according to one example embodiment;

FIG. 4 describes a process for a direct determination of a power controlling matrix, according to one example embodiment; and FIG. 5 describes a process for determining the power controlling matrix using an iterative updating algorithm, according to one example embodiment.

DETAILED DESCRIPTION

Figure 1:
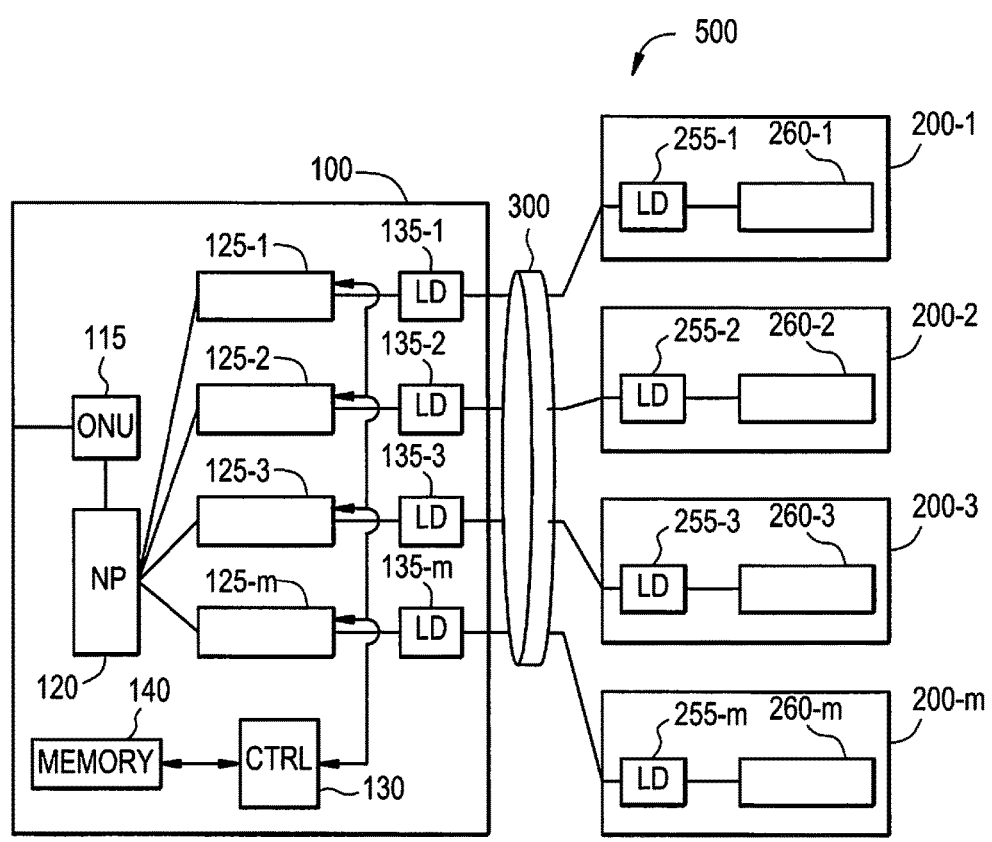
FIGS. 1-5 represent non-limiting, example embodiments as described herein.

Various example embodiments will now be described more fully with reference to the accompanying drawings in which some example embodiments are illustrated.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more Central Processing Units (CPUs), digital signal processors (DSPs), application-specific-integrated-circuits, field programmable gate arrays (FPGAs) computers or the like.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of example embodiments are typically encoded on some form of tangible (or recording) storage medium. The tangible storage medium may be magnetic (e.g., a floppy disk or a hard drive) or optical (e.g., a compact disk read only memory, or "CD ROM"), and may be read only or random access. Example embodiments are not limited by these aspects of any given implementation.

FIG. 1 illustrates a communication system, according to an example embodiment. As shown in FIG. 1, a system 500 includes a distribution point or access node 100 and Customer Premises Equipment (CPEs) 200-1 to 200-m, where m may be an integer greater than 1.

The access node 100 may be under control of an operator. The access node 100 includes an optical network unit (ONU) 115 configured to communicate with a network processor (NP) 120. As is known, the ONU 115 provides a high-bandwidth data connection over a fiber optic channel to an optical line terminal (OLT) located in a central office. The ONU 115 passes received downstream data frames or packets to the NP 120, which then determines the destination for the frames or packets and accordingly forwards them to an appropriate interface (e.g., DSL, ADSL, VDSL, VDSL2, etc. interface). Similarly, in the upstream direction, the NP 120 forwards frames or packets from the interfaces to the ONU 115.

The NP 120 provides signals to processing devices 125-1 to 125-m. The processing devices 125 are configured for point-to-point communication.

The access node 100 further includes a controller 130. The controller 130 is configured to receive signal data collectively referred to as a signal vector from the processing devices 125. The signal data may include signal values intended to be received by corresponding processing devices 260-1 to 260-m in the CPEs 200. In the downstream direction, the controller 130 is also configured to pre-code the signal vector, and send the resulting data back to the processing devices 125 for transmission to the CPEs 200. The processing devices 125 then send the pre-coded signal data over respective lines 300 via respective analog front ends (AFEs) 135-1 to 135-m.

In the upstream direction, the processing devices 125 receive crosstalk-contaminated signals from the AFEs 135. The controller 130 receives the crosstalk-contaminated signals (collectively referred to as received signal vector) from the processing devices 125, post-codes the received signal vector, and provides the processing devices 125 with the post-compensated signal data. The processing devices 125 then continue to process the signal data to demodulate the intended upstream information.

Generally, the data exchanged between processing devices would be frequency-domain samples, but alternatively the data could be represented as time-domain samples, for example.

As discussed above, the controller 130 communicates with the processing devices 125. Alternatively, the controller 130 may be between the processing devices 125 and the AFEs 135-1 to 135-m. Thus, the location of the controller 130 is not limited to the location shown in FIG. 1.

Furthermore, it will be understood that the access node 100 may include a memory 140, or multiple memories. The NP 120, the controller 130, and/or the processing devices 125 execute programs and/or program modules stored on the memory 140 to perform their respective functions and the functions of the access node 100. The memories may be external to and/or internal to the NP 120, the controller 130, and/or the processing devices 125. For the purposes of simplicity of illustration only, only the memory 140 associated with the controller 130 is shown.

As discussed above, each of the processing devices 125 may communicate with a respective one of the CPEs 200 over the communication lines 300 through an associated AFE 135. The lines 300 (also referred to as links) may be telephone lines (e.g., twisted copper pairs), and the CPEs 200-1 to 200-m may be modems or other interface devices operating according to a communication standard for transmitting data over telephone lines. The CPEs 200-1 to 200-m may be located in various customer premises. Each of the CPEs 200-1 to 200-m includes an AFE 255-1 to 255-m and respective processing devices 260-1 to 260-m. Each of the AFEs 255 may be the same or substantially the same as the AFEs 135.

Figure 2:
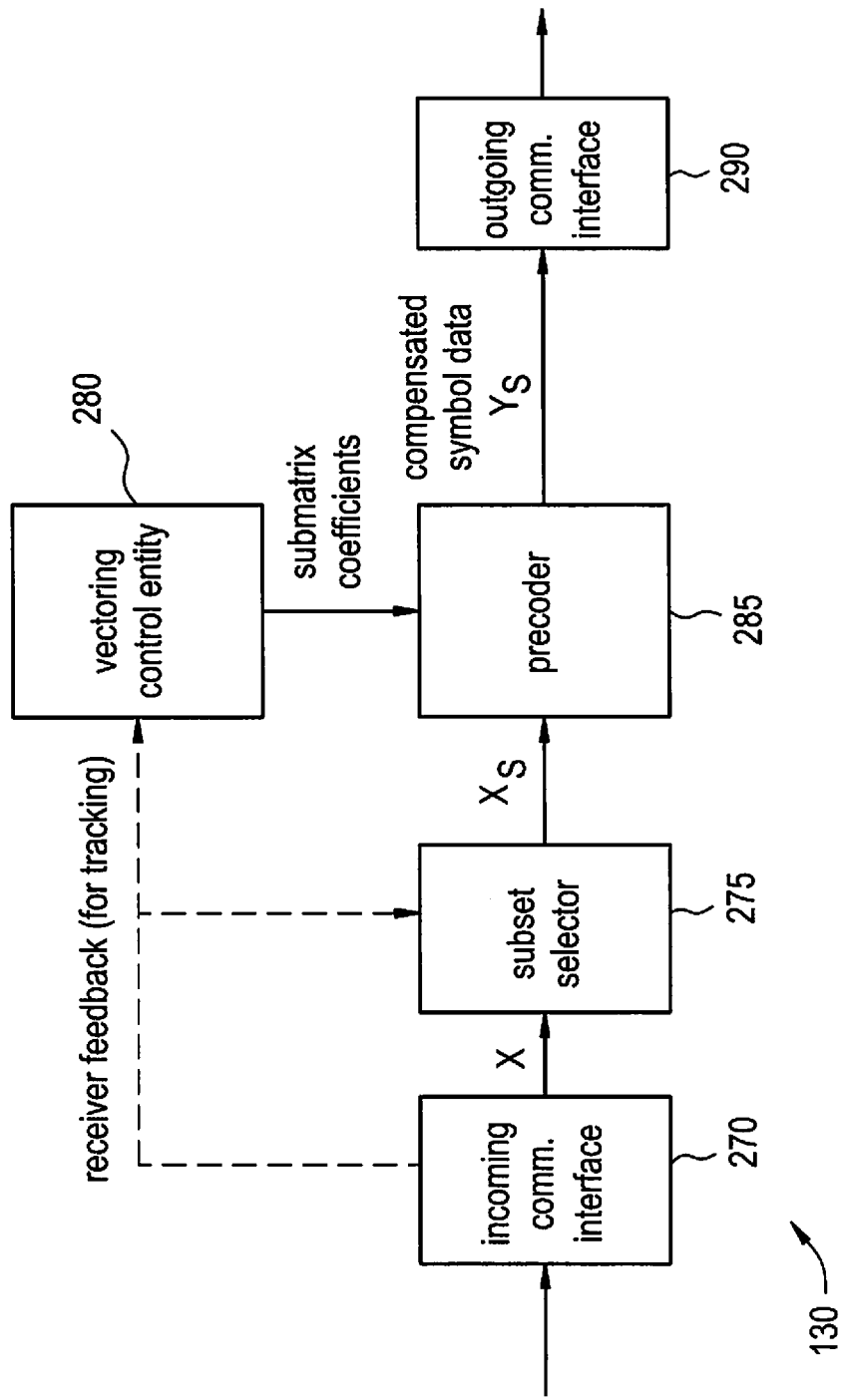

FIG. 2 illustrates the controller 130 including a pre-coder, according to an example embodiment. While FIG. 2 is described as pre-coder, it should be understood that the same structure applies to a post-coder. The controller 130 has a communication interface 270 with each of the processing devices 125-1 to 125-m. The incoming communication interface 270 receives data and control signals from the processing devices 125-1 to 125-m. The incoming communication interface 270 forwards symbol data x from the respective processing devices 125-1 to 125-m that are to be pre-coded to the subset selector 275.

The processing devices 125-1 to 125-m may maintain individual queues containing packets of information to be sent on each of the m lines. At any point in time, some queues may have packets waiting to be sent, while other queues are empty.

An active line may or may not have data to send. An active line without data to send is called an idle line. In a vectored system, all active idle lines send compensation signals generated by the pre-coder 285, regardless of whether they have data to send. The incoming communication interface 270 designates the active lines for transmission.

The subset selector 275 receives a signal x. Based on the signal x, the subset selector 275 determines a plurality of signal values $x_s$ (symbols). The plurality of signal values $x_s$ is a vector obtained by taking the symbols from x corresponding to the active lines.

While FIG. 2 illustrates the subset selector 275, it should be understood that example embodiments are not limited thereto and include systems without a subset selector. For example, in some systems, if there is no user data to send, the system fills in dummy data. In such systems all lines are always active and there is no subset selector.

The subset selector 275 forwards symbol data $x_S$ to a pre-coder 285.

The incoming communication interface 270 also forwards receiver feedback, such as crosstalk characteristics to the subset selector 275 and to a vectoring control entity (VCE) 280.

The crosstalk characteristics could be error feedback samples or DFT output samples collected by the receiver (the samples are then processed by correlation etc. to come up with estimates of crosstalk coefficients). Alternatively, the crosstalk characteristics could be estimates of crosstalk coefficients computed elsewhere and then forwarded to the VCE 280. Additionally, the crosstalk characteristics could be other forms of feedback, e.g., SNR measurements that are affected by crosstalk and can be used to learn something about the crosstalk.

The pre-coder 285 applies coefficients received from the VCE 280 to the symbol data received from the subset selector 275 to produce compensated data symbols $y_s$ (pre-coded data), which are forwarded to an outgoing communication interface 290. The outgoing communication interface 290 sends the compensated data symbols to the processing devices 125-1 to 125-m. Additionally, the incoming communication interface 270 periodically receives receiver feedback data, which it forwards to the VCE 280.

In FIG. 2, the incoming communication interface 270, the subset selector 275, the pre-coder 285 and the outgoing communication interface 290 may be considered data path elements while the vectoring control entity 280 may be considered control path elements that instruct the data path elements what to do.

Each of the incoming communication interface 270, the subset selector 275, the pre-coder 285, the outgoing communication interface 290 and the vectoring control entity 280 may be implemented in hardware, a processor configured to execute software, firmware, or any combination thereof, for example. When at least one of the incoming communication interface 270, the subset selector 275, the pre-coder 285, the outgoing communication interface 290 and the vectoring control entity 280 is hardware, such existing hardware may include one or more Central Processing Units (CPUs), digital signal processors (DSPs), application-specific-integrated-circuits (ASICs), field programmable gate arrays (FPGAs) computers or the like configured as special purpose machines to perform the functions of the at least one of the incoming communication interface 270, the subset selector 275, the pre-coder 285, the outgoing communication interface 290 and the vectoring control entity 280. CPUs, DSPs, ASICs and FPGAs may generally be referred to as processors and/or microprocessors.

In the event where at least one of the incoming communication interface 270, the subset selector 275, the pre-coder 285, the outgoing communication interface 290, and the vectoring control entity 280 is a processor executing software, the processor is configured as a special purpose machine to execute the software, stored in a storage medium (e.g., memory 140), to perform the functions of the at least one of the incoming communication interface 270, the subset selector 275, the pre-coder 285, the outgoing communication interface 290 and the vectoring control entity 280. In such an embodiment, the processor may include one or more Central Processing Units (CPUs), digital signal processors (DSPs), application-specific-integrated-circuits (ASICs), field programmable gate arrays (FPGAs) computers.

The performance of the above-mentioned pre-coding control mechanism, discussed in the Background Section, may deteriorate for channels that experience high levels of crosstalk and/or in systems that use frequencies above a certain frequency (e.g., above 17 MHz), because in such systems the crosstalk channel matrix may no longer be a diagonally dominant channel matrix. For example, communication lines in a VDSL2 system may experience high crosstalk in situations where physical properties of the communication lines may change (e.g., due to temperature changes in the copper cable) and/or frequent joining and leaving events of individual communication lines. Furthermore, utilization of a straightforward diagonalizing pre-coder (e.g., the pre-coding control mechanism discussed in the Background Section and equation (4b) below) may also result in violation of power spectral density (PSD) constraints at high levels of crosstalk.

Existing solutions include scaling down or clipping pre-coding coefficients in order to enforce PSD constraints. However, scaling down a row of the pre-coding matrix or clipping relatively large values of the pre-coding matrix will adversely affect the performance of all communication lines.

Gain scaling is another existing solution. According to gain scaling, a power controlling matrix $\Lambda$ is applied to an inverse of (I+G) to yield a pre-coding matrix C (i.e., $C=(I+G)^{-1}\Lambda$, with I being an identity matrix and G being a crosstalk channel matrix. Doing so would theoretically enable full cancellation of crosstalk interferences. However, when the crosstalk channel matrix G is non-diagonally dominant, then so will be the resulting pre-coding matrix C, which would result in a slow convergence of the system when refining the pre-coding matrix or tracking changes in the channel through an iterative procedure. In addition, because the end-to-end channel gain experienced by a user of one of the communication lines is influenced by the power controlling matrix, some changes (e.g., large changes) in the power controlling matrix should be coordinated with the receiver to avoid errors. In G.fast systems, such a mechanism, referred to as Transmitter Initiated Gain Adaptation, is provided. But in systems without the Transmitter Initiated Gain Adaptation mechanism, such as a VDSL or VDSL2 system, gain scaling would have to be static or alternatively adapt slowly, which indicates that enforcing the PSD constraints in a dynamic system would be difficult.

Accordingly, the inventors have discovered that a modified pre-coding control mechanism to address systems with high levels of crosstalk and/or systems that may operate at relatively high frequencies (e.g., above 17 MHz).

Next, a series of notations are introduced, which will be utilized in describing example embodiments of the present application.

H is a channel matrix, the determination of which may depend on a crosstalk channel matrix G and a direct channel gain matrix D. Coefficients of the crosstalk channel matrix G represent the level of crosstalk experienced by each communication line (e.g., lines 300, as shown in FIG. 1). I is an identity matrix, with 1 as its diagonal entries while all other entries of the identity matrix I are zeros. The subscripts U and D are indicative of the upstream and downstream channels/operations, respectively.

Accordingly, the upstream and downstream channel matrices may be respectively represented by equations (1) and (2) shown below, $$H_U = (I + G_U) D_U \quad (1)$$

$$H_D = D_D (I + G_D) \quad (2)$$

As should be understood, the upstream and downstream channels are multiple-input-multiple-output (MIMO channels).

In one example embodiment and in order to cancel crosstalk and noise, the controller 130 may determine a vectoring matrix C. For the downstream operation, the vectoring matrix C may be referred to as a pre-coding matrix $C_D$. For the upstream operation, the vectoring matrix C may be referred to as a post-coding matrix $C_U$. The controller 130 may determine the pre-coding matrix $C_D$ and the post-coding matrix $C_U$ based on estimates of crosstalk channels and activation/deactivation events. Furthermore, the controller 130 may determine the pre-coding matrix $C_D$ and the post-coding matrix $C_U$ periodically and/or dynamically.

Ideally, the controller 130 determines the post-coding matrix $C_U$ according to equation (3a) shown below. Ideally, the controller 130 determines the pre-coding matrix according to equation (4a) shown below. A compensation matrix $\Omega$ for the upstream and downstream are respectively defined in equations (3a) and (4a) below.

$$C_U - I = \Omega_U \quad (3a)$$

$$C_D - I = \Omega_D \quad (4a)$$

where $C_D$ is a pre-coder and $C_U$ is a post-coder. Equations (3a) and (4a) represent general forms of the post-coding and pre-coding matrices respectively.

A particular choice of the post-coding matrix and the pre-coding matrix are respectively shown in equations (3b) and (4b) below.

$$C_U = (I + G_U)^{-1} \quad (3b)$$

$$C_D = (I + G_D)^{-1} \quad (4b)$$

If the post-coding matrix $C_U$ or the pre-coding matrix $C_D$, as shown in equations (3b) and (4b) above, is the inverse of respective one of the normalized channel matrices $(I + G_U)$ and $(I + G_D)$, then the resulting post-coding matrix $C_U$ or the pre-coding matrix $C_D$, when applied to the respective one of the normalized channel matrices $(I + G_U)$ and $(I + G_D)$, yields an identity matrix I, which indicates that all crosstalk and noise is eliminated. This is shown by the mathematical relationships (5) and (6) below, for the upstream and downstream channels, respectively.

$$R_U = C_U (I + G_U) \quad (5)$$

$$R_D = (I + G_D) C_D \quad (6)$$

In VDSL systems, the pre-coding and post-coding matrices $C_D$ and $C_U$ may be determined by the controller 130, either directly or using a feedback control of the following form:

$$\Omega[n+1] = \Omega[n] - A[n]\hat{E}[n] \quad (7)$$

where n represents a number of iterations in the feedback control loop, $\hat{E}[n]$ is an estimate of a current error matrix, and A[n] is a diagonal noise reducing matrix with weights between 0 and 1. E is an error matrix (which may also be referred to as a residual crosstalk matrix), which in one example embodiment may be represented as:

$$E = R - I \quad (8)$$

replacing R in equation (8) with equation (5) or (6), yields a residual crosstalk matrix for upstream and downstream channels, respectively, as shown by equations (9) and (10) below.

$$E_U = G_U + \Omega_U + \Omega_U G_U \quad (9)$$

$$E_D = G_D + \Omega_D + G_D \Omega_D \quad (10)$$

From now on and for ease of description, example embodiments will be described with respect to the downstream channel/operation and the subscript notations for downstream and upstream channels will be omitted. However, the example embodiments may be easily modified and applied to the upstream channel as well, by a person having ordinary skills in the art.

In equation (10) above, when G is small (i.e., when all eigenvalues of G are smaller than 1 in magnitude and G is diagonally dominant), the sequence of pre-coding matrices defined by equation (7) may converge to the desired pre-coding matrix C (e.g., $C = (I + G)^{-1}$), as described above. Furthermore, one or more of the communication lines 300 may have PSD constraints associated therewith. According, when G is small, the PSD constraints of the one or more of the communication lines may be enforced. However, when G is too large (e.g., when G is non-diagonally dominant, which is indicative of a DSL system with high crosstalk), the convergence of the sequence of pre-coding matrices to a pre-coding matrix $C = (I + G)^{-1}$, using equation (7), is not guaranteed and in addition the PSD constraints may not be properly enforced.

To guarantee a convergence of the pre-coding matrix and enforcement of PSD constraints, in one example embodiment, a power controlling matrix may be determined by the controller 130 and utilized by the controller 130. In particular, instead of designing C as $C = (I + G)^{-1}$, the pre-coding matrix C may be obtained by the controller 130 as follows:

$$C = (I + \Omega) = (I + \Lambda G)^{-1} \quad (11)$$

where $\Lambda$ is the power controlling matrix. In one example embodiment, $\Lambda$ is a diagonal matrix with diagonal entries equal to or greater than 0 and equal to or less than 1. Entries of $\Lambda$ may be referred to as power controlling parameters, while entries of a leakage matrix $I - \Lambda$ are leakage parameters.

In one example embodiment, the power controlling parameters may be determined by the controller 130 to ensure that the product $\Lambda G$ is small such that the eigenvalues of the product $\Lambda G$ are less than 1 in magnitude. Accordingly, the determined power controlling matrix $\Lambda$ achieves both the convergence of the pre-coding matrix as well as the enforcement of the PSD constraints.

Figure 3:
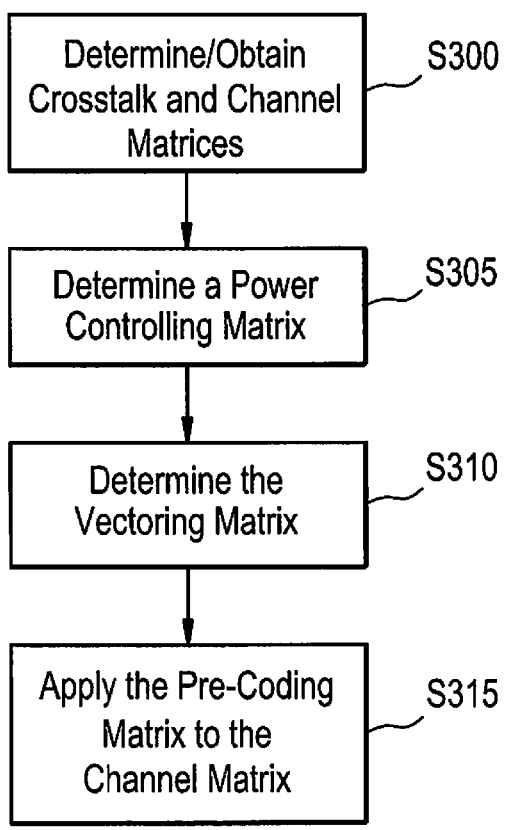

Hereinafter, examples embodiments for determining the power controlling matrix $\Lambda$ will be described. FIG. 3 describes a process for determining the power controlling matrix, according to one example embodiment. As a reminder, the process of FIG. 3 is described with reference to the downstream channel. However, the described process of FIG. 3 may be modified and may be applied to the upstream channel as well.

At S300, the controller 130 determines the downstream crosstalk matrix G and the downstream channel matrix H. The downstream crosstalk channel matrix G may be obtained, as described above. Downstream channel matrix H may be obtained using equation (2), as described above.

At S305, the controller 130 determines a power controlling matrix $\Lambda$. The power controlling matrix $\Lambda$ may be determined in one of several ways. In one example embodiment, the power controlling matrix may be determined directly from the downstream crosstalk channel matrix G. The direct determination of the power controlling matrix will be described with reference to FIG. 4 below. In another example embodiment, parameters of the power controlling matrix $\Lambda$ may be determined using an iterative updating algorithm for the pre-coding matrix based on a modified version of equation (7), as will be described below. The determination of the parameters of the power controlling matrix $\Lambda$ based on an iterative updating algorithm will be described with reference to FIG. 5 below.

Once the power controlling matrix is determined at S305, then at S310, the controller 130 determines a vectoring matrix, which in the downstream operation is the same as a pre-coding matrix. In one example embodiment, the controller 130 determines the pre-coding matrix by applying the determined power controlling matrix $\Lambda$ to the downstream crosstalk channel G, according to equation (11).

Thereafter, at S315, the controller 130 applies the resulting pre-coding matrix to the downstream channel matrix H. The resulting matrix R is then used for communicating data on the plurality of active communication lines between the distribution center 110 and the plurality of CPEs $150_1$ to $150_n$, shown in FIG. 1.

Figure 4:
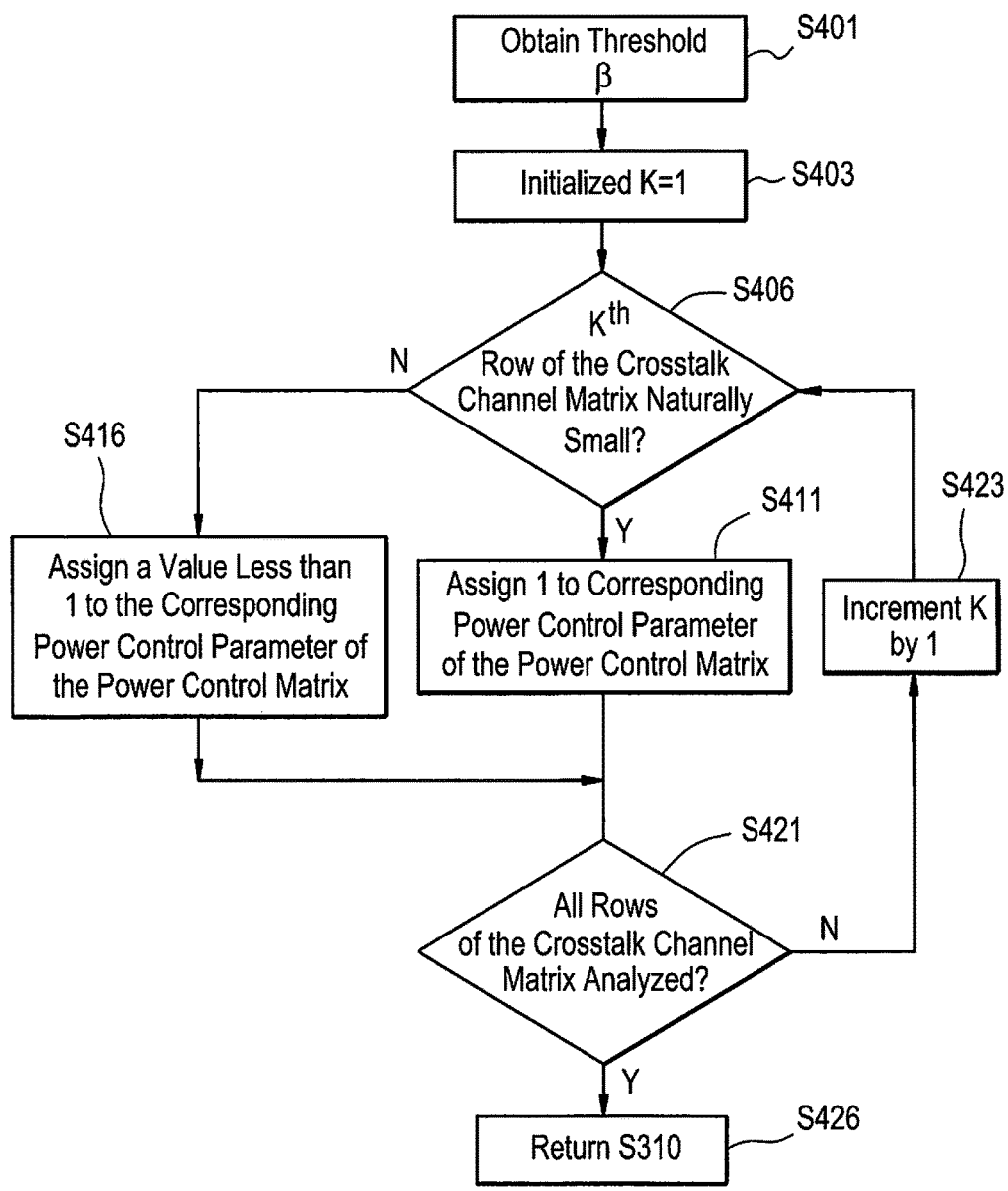

A direct determination of the power controlling matrix at S305 will now be described. FIG. 4 describes a process for a direct determination of the power controlling matrix $\Lambda$, according to one example embodiment.

At S401, the controller 130 obtains a threshold $\beta$. In one example embodiment, $\beta$ may be a design parameter that is determined based on empirical studies. The threshold $\beta$ may be chosen by an operator of the system. The smaller the threshold $\beta$ is, the faster the system will converge to a final solution (e.g. after joining or leaving operations). Larger values of threshold $\beta$ may result in a pre-coder with better performance once the system converges to the final solution. Accordingly, in one example embodiment, the threshold $\beta$ may be obtained by the controller 130 based on a tradeoff between the speed of convergence and the quality of the performance of the pre-coder.

At S403, the controller 130 initializes a variable k to 1. The variable k represents an index of a row of the power controlling matrix $\Lambda$ and is between 1 and the maximum number of communication lines 300 (which is m as shown in FIG. 1).

At S406, the controller 130 examines the $k^{th}$ row of the downstream crosstalk channel matrix G obtained at S300, described above with reference to FIG. 3. In one example embodiment, the controller 130 determines whether the $k^{th}$ row of the downstream crosstalk channel matrix G is naturally small (e.g., the sum over j of $|G_{kj}|$ is less than $\beta$).

If at S406, the controller 130 determines that the $k^{th}$ row of the downstream crosstalk channel matrix G is naturally small, then at S411, the controller 130 assigns $\lambda_k=1$ to the $k^{th}$ diagonal power controlling parameter of the power controlling matrix $\Lambda$.

If at S406, the controller 130 determines that the $k^{th}$ row of the downstream crosstalk channel matrix G is not naturally small, then at S416, the controller 130 assigns a value of less than 1 to $\lambda_k$. A value smaller than 1 for $\lambda_k$ results in suppression of crosstalk by a factor of $(1-\lambda_k)$ for the $k^{th}$ victim line.

In one example embodiment, for the $k^{th}$ row of the downstream crosstalk channel matrix G that is not naturally small, the controller 130 determines $\lambda_k$ as $$\beta\left(\sum_j |G_{kj}|\right)^{-1},$$

where $\beta$ is the above defined threshold obtained at S401 and $$\left(\sum_j |G_{kj}|\right)^{-1}$$

is the inverse of the absolute row sum for the $k^{th}$ row of downstream crosstalk channel matrix G.

In summary, the controller 130 may determine the power controlling parameters of $\Lambda$ according to the following expression:

$$\lambda_k = \min\left[1, \beta\left(\sum_j |G_{kj}|\right)^{-1}\right] \quad (12)$$

Thereafter, at S421 and after examining the $k^{th}$ row of the downstream crosstalk channel matrix G, the controller 130 determines whether all rows of the crosstalk channel matrix G have been examined/analyzed. If at S421 the controller 130 determines that all rows of the crosstalk channel matrix G have not be examined/analyzed, then the process proceeds to S423 where the variable k is incremented by 1 and then the process reverts back to S406 and the controller 130 repeats S406 to S421 until all rows of the downstream crosstalk channel matrix G are examined/analyzed.

If at S421, the controller 130 determines that all rows of the downstream crosstalk channel matrix G have been examined/analyzed, then the process reverts back to S305 at S426 with the power controlling matrix $\Lambda$ determined.

In the example embodiment of FIG. 4, the controller 130 determines the power controlling matrix $\Lambda$ to have the following properties. First, the power controlling matrix $\Lambda$ is determined such that a measure of strength (e.g., a norm) of a product of the power controlling matrix $\Lambda$ and the downstream crosstalk channel matrix G, is less than the threshold $\beta$. This measure of strength can be a measure that is an upper bound on the spectral radius $\rho(\Lambda G)$, in which case the chosen matrix is such that $\rho(\Lambda G)$ is smaller than $\beta$. Determining the power controlling matrix $\Lambda$ such that $\rho(\Lambda G)$ would be smaller than $\beta$, ensures that the converged compensation matrix $\Omega$ is small and thus the pre-coding matrix C converges quickly. In other words, the pre-coding matrix C converges to the expression on the right hand side of equation (11) (when iteratively applying equations (20) or (21), provided below). Quickness has to do with the number of iterations needed before the pre-coding matrix C is sufficiently (within a threshold) close to satisfying equation (11). The "distance" between the pre-coding matrix C and an ideal pre-coding matrix basically follows a geometric progression, being proportional to $\beta^n$ after n iterations. As a result, choosing a smaller $\beta$ makes the convergence faster. However, the smaller $\beta$ uses a smaller power-controlling matrix $\Lambda$, which makes equation (11) farther away from the ideal equation (4b).

If the power controlling matrix $\Lambda$ is not an identity matrix, the objective of complete cancellation of crosstalk may not be achieved because the pre-coding matrix $C_D$ may no longer take on the ideal form expressed in equation (4). For a non-identity $\Lambda$, there is a residual crosstalk matrix E, which may be expressed as:

$$E=(I+G)C-I=(I+\Lambda G)C+(I-\Lambda)GC-I=(I-\Lambda)G(I+\Lambda G)^{-1} \quad (13)$$

assuming the pre-coding matrix has converged to $C=(I+\Lambda G)^{-1}$.

The leading term $(I-\Lambda)$ on the left side of the last expression in equation (13) indicates that the residual interference may be controlled on a row-by-row basis, i.e. per victim line, where each victim line may be any one of the plurality of communication lines (e.g., lines 300 in FIG. 1) that experience crosstalk induced by the remaining ones of the communication lines. In particular, for any victim line k with $\lambda_k=1$, the corresponding row of the error matrix E converges to zero. However, for any victim line k with $\lambda_k<1$, the corresponding row of the error matrix E may not converge to zero, meaning that the line will be partially protected and the crosstalk will be partially suppressed (e.g., by a factor of $(1-\lambda_k)$. For a given downstream crosstalk channel matrix G, such as the one obtained at S300, the norm of $\Lambda G$ may be made small by ensuring that each row is small.

While the method of FIG. 4 is described with reference to the downstream channel/operation, the described method may be modified and applied to the upstream channel/operation as well.

The process of determining a power controlling matrix and subsequently a post-coding matrix on the upstream channel is similar as that described above for the downstream channel with reference to FIG. 4.

For example, post-coding matrix $C_U$ may be obtained by the controller 130 as follows:

$$C_U(I+\Omega)=(I+G\Lambda)^{-1} \quad (14)$$

where in equation (14), when compared to equation (11) for the downstream channel, the power controlling matrix $\Lambda$ appears on the right of the upstream crosstalk channel matrix $G_U$ instead of the left.

Furthermore, the equivalent of equation (12) for the upstream channel is as follows:

$$\lambda_k = \min\left[1, \beta\left(\sum_j |G_{jk}|\right)^{-1}\right] \quad (15)$$

where in equation (15), when compared to equation (12), the indices k and j are switched in order to ensure that the absolute column sum of the product $(G_U\Lambda)$ of the upstream crosstalk channel matrix $G_U$ and the power controlling matrix $\Lambda$ is lower than the threshold $\beta$.

Accordingly, the equivalent of equation (13) for the error matrix for the upstream channel is:

$$E=C(I+G)-I=(I+G\Lambda)^{-1}[(I+G\Lambda)+G(I-\Lambda)]-I=(I+G\Lambda)^{-1}G(I-\Lambda) \quad (16)$$

where matrices C and G represent the post-coding matrix $C_U$ and the upstream crosstalk channel matrix $G_U$, respectively.

In equation (16), because the term $(I-\Lambda)$ is on the right side instead of the left side as is the case in equation (13), the power controlling parameters directly control the influence of different disturbers (e.g., communication lines that induce crosstalk interference on a victim line). For example, if $\lambda_k=1$, then crosstalk from the $k^{th}$ communication line on all other lines is fully cancelled, while if $\lambda_k<1$, crosstalk from the $k^{th}$ communication line may affect all lines.

Accordingly, fast convergence of tracking updates, and/or controlling the size of the power controlling parameters in the upstream channel is also achieved.

As an alternative to a direct determination of the power controlling matrix $\Lambda$ described above, an iterative updating algorithm may be implemented to constantly update the power controlling parameters of the power controlling matrix $\Lambda$.

Figure 5:
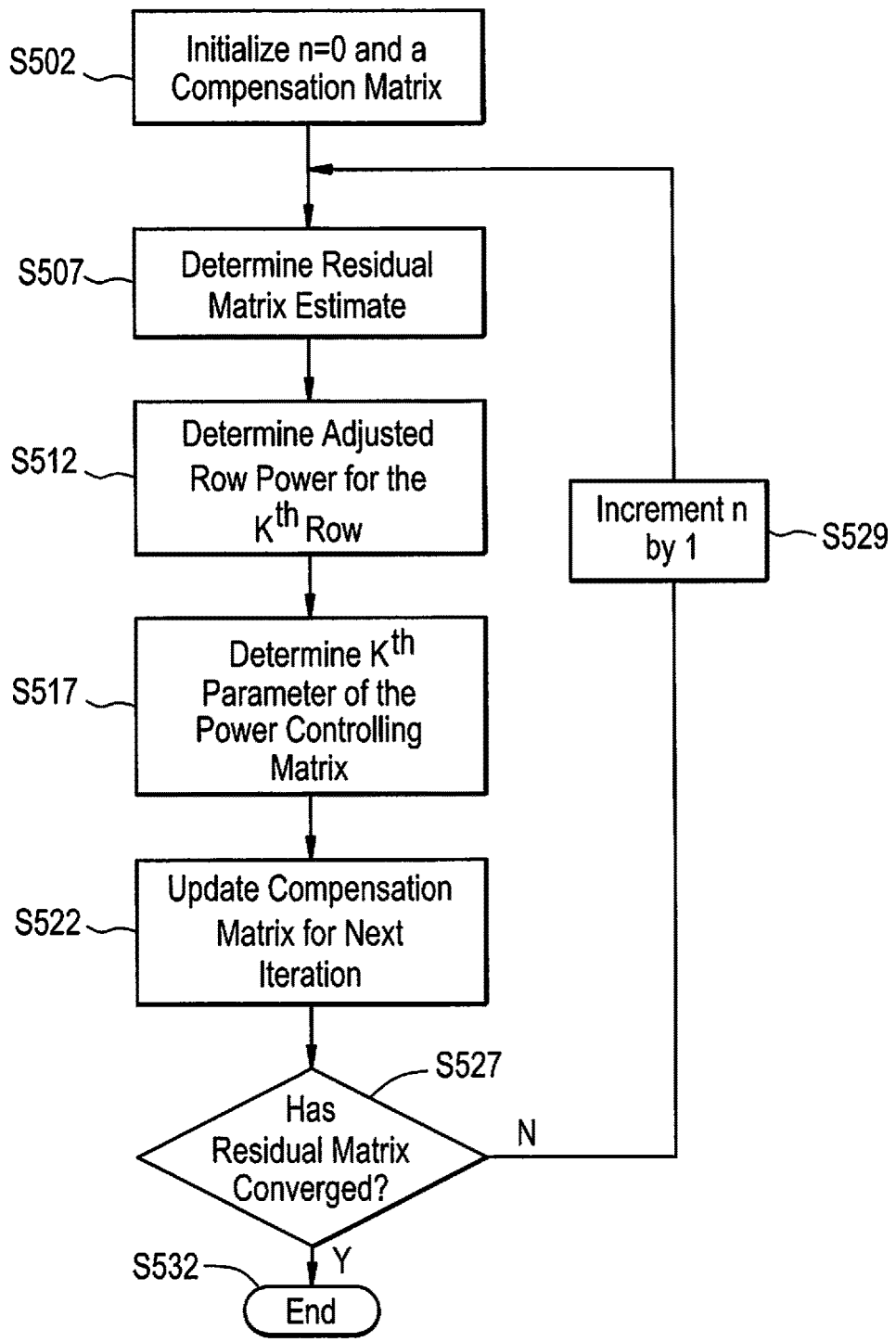

FIG. 5 describes a process for determining the power controlling matrix using an iterative updating algorithm, according to one example embodiment. As a reminder, the process of FIG. 5 is described with reference to the downstream channel.

At S502, the controller 130, initializes a variable n to 0 and a compensation matrix $\Omega[n]$ for n=0, where n indicates the iteration step of the iterative updating algorithm in determining the power controlling matrix and updating the pre-coding matrix C utilized by the pre-coder 285. In other words, FIG. 5 illustrates an example embodiment where the controller 130 modifies the power controlling parameters as part of updating the pre-coding matrix C utilized by the pre-coder 285.

In one example embodiment, the controller 130 determines $\Omega[0]$ such that power constraints of all of the communication lines 300 are satisfied. The controller 130 ensures that the power constraints are enforced by determining $\Omega[0]$ such that $r_k(\Omega[0]) \leq \beta^2$, where k is variable between 0 and the maximum number of rows of $\Omega[0]$ (e.g., the maximum number of rows of $\Omega[0]$ may correspond to the maximum number of communication lines 300, which in FIG. 1 is equal to m).

In one example embodiment, $r_k$ is defined as a row sum operator given by:

$$r_k(B)=\Sigma_j|B_{kj}|^2 \quad (17)$$

where the variable B may be replaced with specific iterations of $\Omega$ (e.g., $\Omega[0]$). Furthermore, j is a variable that increments from 1 to the maximum number of columns of $\Omega[0]$ (e.g., the maximum number of columns of $\Omega[0]$ may correspond to the maximum number of communication lines, which in FIG. 1 is equal to m, given that G is a square matrix).

At S507 and during each iteration of the iterative updating of the power controlling matrix $\Lambda$, the controller 130 determines an estimate of a residual crosstalk matrix E[n] (e.g., E[n] for n=0), which may be represented as $\hat{E}[n]$. In one example embodiment, the controller 130 determines the estimate of the residual crosstalk matrix $\hat{E}[n]$ based on sending probe signals, collecting error feedback and processing the error feedback, using any known method.

At S512, the controller 130, determines for each row k of the Ω matrix, an adjusted row power. In one example embodiment, the adjusted row power for the $k^{th}$ row may be expressed as:

$$\theta_k = r_k(\Omega[n] - \hat{E}[n]) = \sum_j |(\Omega[n] - \hat{E}[n])_{kj}|^2 \qquad (18)$$

with k=1, . . . , m (where m is the maximum number of communication lines).

At S517, the controller 130 determines the $k^{th}$ parameter of the power controlling matrix Λ. In one example embodiment, the controller 130 determines the $k^{th}$ parameter of the power controlling matrix according to the following expression:

$$\lambda_k[n] = \min(1, \beta\theta_k^{-1/2}) \qquad (19)$$

At S522, the controller 130 updates the compensation matrix Ω for the next iteration using the power controlling parameters determined at S517. In one example embodiment, the controller 130 updates the compensation matrix according to the following expression:

$$\Omega[n+1] = (I - A[n](I - \Lambda[n]))\Omega[n] - A[n]\Lambda[n]\hat{E}[n] \qquad (20)$$

Equation (20) may be rewritten as:

$$\Omega[n+1] = (I - A[n])\Omega[n] + A[n]\Lambda[n](\Omega[n] - \hat{E}[n]) \qquad (21)$$

where equation (21) illustrates that during each iteration of the iterative updating, Ω[n+1] is a convex combination of a compensation matrix of the previous iteration (e.g., Ω[n]) and a second matrix, both of which satisfy the PSD constraints, which implies that Ω[n+1] satisfies the PSD constraints. At S522, the controller also determines the pre-coding matrix $C_D$ using equation (4a) after the compensation matrix Ω[n+1] is determined.

At S527, the controller 130 determines whether the estimate of the residual matrix Ê[n] determined at S507 has converged. In one example embodiment, the controller 130 determines that the estimate of the residual matrix Ê[n] has converged if for a number of iterations the value of Ê[n] does not vary or only experiences small variations.

If the controller 130 determines at S527 that the estimate of the residual matrix Ê[n] has not converged, then at S529 the controller 130 increments n by 1. Thereafter, the process reverts back to S507 and the controller 130 repeats S507 to S527 until the controller 130 determines that Ê[n] has converged. Thereafter, at S532, the controller 130 ends the iteration.

In an alternative example embodiment of the iterative updating, described above with reference to FIG. 5, the controller 130 may not determine updated power controlling parameters at S335 during each iteration of the iterative updating algorithm. Instead, the controller 130 retains the power controlling parameters previously determined until the compensation power leaves a specified range. For example, if the power control matrix Λ is fixed to some value, Λ[1], and equation (21) is consistently applied, then the pre-coding matrix C[n] will converge toward $(I+\Lambda[1]G)^{-1}$, which may have a row power that is too high or too low. As the pre-coding matrix C[n] converges toward $(I+\Lambda[1]G)^{-1}$ that may have a row power that is too high, then as n increases, the pre-coding matrix C[n] will have even higher row power. At that point, the controller 130, instead of using the pre-coding matrix C[n], updates the power controlling matrix to a new value as reflected in equation (24) below. In one example embodiment, the specified range may be determined based on the threshold β and a parameter ε, as reflected in equations (23) and (24) below.

Accordingly, S512 of FIG. 5 may be modified such that the controller 130 determines the $k^{th}$ row power during each iteration of the iterative updating algorithm, based on the following expression:

$$\theta_k = r_k(\Lambda[n-1](\Omega[n] - \hat{E}[n])) = \sum_j |\Lambda[n-1](\Omega[n] - \hat{E}[n])_{kj}|^2 \qquad (22)$$

Furthermore, S517 of FIG. 5 may be modified as follows:

$$\text{If } (1-2\varepsilon)^2\beta^2\lambda_k[n-1]^2 \leq \theta_k \leq \beta^2\lambda_k[n-1]^2, \text{ then } \lambda_k[n] = \lambda[n-1] \qquad (23)$$

$$\text{Else, } \lambda_k[n] = \min(1, (1-\varepsilon)\beta\theta_k^{-1/2}\lambda[n-1]) \qquad (24)$$

where ε is a parameter specifying the width of a range of target values for a communication line that has a constrained power associated therewith. In other words, instead of determining the row sum of each controlled row to be exactly equal to $\beta^2$, the controller 130 determines the row sum of each row to be between $(1-2\varepsilon)^2\beta^2$ and $\beta^2$.

In one example embodiment, the exact/optimal power controlling parameters may not be used because relatively small changes in $\lambda_k$ may not translate to significant changes in vectoring gain on communication line k. For example, a power controlling parameter for line k, limits the vectoring gain on line k to approximately $-20*\log_{10}(1-\lambda_k)$. Accordingly, using $\lambda_k=0.0$ translates into no vectoring gain for the $k^{th}$ communication line while $\lambda_k=0.2$, translates into only a 2 dB vectoring gain on the $k^{th}$ communication line, meaning that the performance on the $k^{th}$ communication line is not very sensitive to $\lambda_k$ for $\lambda_k$ near 0.

While the above observation remains true for values of $\lambda_k$ close to 0, as $\lambda_k$ approaches 1, small changes of $\lambda_k$ may translate into large changes in vectoring gains.

Accordingly, in one example embodiment, just a fixed number of representative values of $\lambda_k$ (e.g., $\lambda_k \in \{0, 0.25, 0.5, 0.75, 1\}$) may be used. Therefore, instead of equations (23) and (24), S517 of FIG. 5, may be modified such that the $k^{th}$ power controlling parameter is determined as the largest value of $\lambda_k$ from the representative values such that $\lambda_k^2\theta_k \leq \beta^2$, where $\lambda_k$, $\theta_k$ and β are the same as defined above.

While the example embodiments above have been described with respect to the operation of the downstream channel as mentioned in several instances, the downstream process may be easily modified and applies to the upstream channel operation. PSD constraints may be enforced in some example embodiments for purposes such as avoiding noise amplification (e.g., noise at an input of a post-coder on the receiver side is amplified at the post-coder outputting depending on the size of the power controlling parameters), avoiding quantization errors or issues arising from the dynamic range of the post-coder, and to simplify the computational requirement at leaving and joining events.

The process of applying the iterative updating algorithm in the upstream channel is similar as that described above for the downstream channel with reference to FIG. 5.

For example, instead of the row sum operation (17), a column sum operator is used, which is given by:

$$c_k(B) = \sum_j |B_{jk}|^2 \qquad (25)$$

where in equation (25) the notation "c" for column in used instead of "r" for row in equation (17). Furthermore, the indices j and k are switched in equation (25) compared to equation (17).

Second, equation (18) is modified to be based on the column sum operator of equation (25) as opposed to row sum operator of equation (17). Therefore, the modified version of equation (18) for the upstream channel is given by equation (26) below.

$$\theta_k = c_k(\Omega[n] - \hat{E}[n]) = \sum_j |(\Omega[n] - \hat{E}[n])_{jk}|^2 \qquad (26)$$

Third, equations (20) and (21) of the downstream channel may be respectively replaced by equations (27) and (28), shown below, for the upstream channel.

$$\Omega[n+1] = \Omega[n](I-(I-\Lambda[n])A[n]) - \hat{E}[n]\Lambda[n]A[n] \qquad (27)$$

$$\Omega[n+1] = \Omega[n](I-A[n]) + (\Omega[n]-\hat{E}[n])\Lambda[n]A[n] \qquad (28)$$

Lastly, equation (22) for the downstream channel may be modified for the upstream channel, as shown below.

$$\theta_k = c_k((\Omega[n] - \hat{E}[n])\Lambda[n-1]) = \sum_j |(\Omega[n] - \hat{E}[n])_{jk}\Lambda[n-1]|^2 \qquad (29)$$

In the example embodiments described above, the power controlling matrix is determined to limit the pre-coder output power (i.e., enforce the PSD constraint of each of the communication lines) or the post-coder. However, in an alternative example embodiment, the power controlling matrix is determined not only to limit the pre-coder output power but also to limit what may be referred to as a cancellation depth. Moreover, in one example embodiment and on the upstream channel, the power controlling matrix is determined to limit the post-coder output power. In an alternative example embodiment and on the upstream channel, the power controlling matrix is determined not only to limit the post-coder output power but also to limit the cancellation depth in the upstream channel.

Cancellation depth (CD) refers to a degree to which a system may decrease crosstalk interference. For example, a cancellation depth of 30 dB means that an original crosstalk of −10 dB may be further reduced to −40 dB through vectoring (i.e., −10 dB-30 dB=−40 dB). A cancellation depth is limited by the precision of the underlying hardware that applies the pre-coding coefficients as well as the accuracy with which the pre-coding coefficients are estimated. While a cancellation depth with as high of a value as possible is ideal, in certain circumstances it may be desirable to limit the cancellation depth for system stability purposes.

For example, a system may experience some sort of an external fluctuating noise and that such external fluctuating noise may fluctuate between −40 dB and −30 dB below the useful signal. VDSL systems may not handle fluctuating noise well enough, which may in turn result in an unstable system. Accordingly, if the cancellation depth is intentionally limited to 20 dB, then crosstalk interference is reduced to only −30 dB as opposed to −40 dB described above. In this instance, the external noise which fluctuates between −30 dB and −40 dB may not adversely affect the performance of the VDSL system.

The cancellation depth of a vectored system may be expressed as the difference between the interference level observed without vectoring and the interference observed with vectoring active, expressed in dB.

In one example embodiment, for a system with an error matrix E, the interference level experienced by the $k^{th}$ communication line is given by:

$$w_k = 10\log_{10}\left(\sum_j |E_{kj}|^2\right) \qquad (30)$$

where $w_k$ represents the interference level experienced by the $k^{th}$ communication line. In equation (30), it is assumed that all communication lines have equal transmit powers.

For an non-vectored system (i.e., a system where the applied pre-coding matrix is an identity matrix C=I), the error matrix E is the same as the downstream crosstalk channel matrix G. In other words, the interference level of the non-vectored system is given by:

$$w_k\{\text{non-vectored}\} = 10\log_{10}\left(\sum_j |G_{kj}|^2\right) \qquad (31)$$

However, for a vectored system, where a pre-coding matrix C to which a power controlling matrix Λ is applied (i.e., $C=(I+\Lambda G)^{-1}$) is used, the error matrix E of the vectored system may be given by:

$$E\{\text{vectored}\}=(I-\Lambda)G(I+\Lambda G)^{-1} \cong (I-\Lambda)G \qquad (32)$$

Therefore, the interference of the vectored system is given by:

$$w_k\{\text{vectored}\} \cong 10\log_{10}\left((1-\lambda_k)^2 \sum_j |G_{kj}|^2\right) \qquad (33)$$

Accordingly, based on the definition of the cancellation depth given above, the cancellation depth is:

$$w_k\{\text{non-vectored}\} - w_k\{\text{vectored}\} \cong -20 \log_{10}(1-\lambda_k) \qquad (34)$$

The above cancellation depth has been described with regard to the downstream channel. However, on the upstream channel, the same cancellation depth may be applied across all victim lines as opposed to a per-victim line depth cancellation. In other words, on the upstream channel, $\lambda_k$ may be replaced with λ for all victim lines and thus equation (34) may be modified for the upstream channel as shown in equation (35) below.

$$w_k\{\text{non-vectored}\} - w_k\{\text{vectored}\} \cong -20 \log_{10}(1-\lambda) \qquad (35)$$

According to equation (35) if Λ=λI, all communication lines experience the same cancellation depth on the upstream channel.

In the example embodiments described above, the same power controlling parameter is applied by the controller 130 to all elements in a row of the pre-coding matrix $C_D$ or to all elements in a column of the post-coding matrix $C_U$.

In an alternative example embodiment, each coefficient in the pre-coding matrix or the post-coding matrix may be updated by the controller 130 with a different power controlling parameter.

Accordingly, instead of a single diagonal power controlling matrix Λ of power controlling parameters, m different power controlling matrices $\Lambda^{(1)}, \ldots, \Lambda^{(m)}$ are determined by the controller 130. The diagonal elements of the m different power controlling matrices define $m^2$ different power controlling parameters.

The corresponding pre-coding matrix $C_D$ is defined, column by column, by:

$$C_D u^{(k)} = (I + \Lambda^{(k)} G_D)^{-1} u^{(k)} \text{ for each } k \quad (36)$$

where $u^{(k)}$ is a column vector whose $k^{th}$ component is 1, with all other elements being zero, such that for any matrix B, the product $B u^{(k)}$ represents the $k^{th}$ column of B.

Similarly, in the upstream direction, the post-coding matrix $C_U$ is defined, row by row, by:

$$u^{(k)T} C_U = u^{(k)T} (I + G_U \Lambda^{(k)})^{-1} \text{ for each } k \quad (37)$$

where $u^{(k)T}$ is a row vector whose $k^{th}$ component is 1, with all other elements being zero, such that for any matrix B, the product $u^{(k)T} B$ represents the $k^{th}$ row of B.

Therefore, in the downstream direction, the $k^{th}$ column of the error matrix E is then given by equation (38) below.

$$E u^{(k)} = (I - \Lambda^{(k)}) G (I + \Lambda^{(k)} G_D)^{-1} u^{(k)} \quad (38)$$

In the upstream direction, the $k^{th}$ row of the error matrix E is given by equation (39) below.

$$u^{(k)} E = u^{(k)T} (I + G_U \Lambda^{(k)})^{-1} G (I - \Lambda^{(k)}) \quad (39)$$

In the downstream direction, the power controlling parameter $\Lambda^{(k)}_{jj}$ is applied by the controller 130 to the compensation coefficient $\Omega_{jk}$ of the compensation matrix $\Omega$. In the upstream direction, the power controlling parameter $\Lambda^{(k)}_{jj}$ is applied by the controller 130 to the compensation coefficient $\Omega_{kj}$ of the compensation matrix $\Omega$. Accordingly, each coefficient of the compensation matrix $\Omega$ may be separately controlled by the controller 130.

One example application of applying different controlling parameters to coefficients of the pre-coding matrix or the post-coding matrix, is to use a more aggressive power controlling scheme for faster convergence of users that have recently initiated a session, as well as to use a less aggressive power controlling scheme for better performance for users that have been active longer than other users. Another example application of applying different controlling parameters to coefficients of the pre-coding matrix or the post-coding matrix, may be to force the diagonal elements of compensation matrix $\Omega$ to zero, for example in vectoring systems in which the diagonal elements of pre-coding matrix or the post-coding matrix are hardwired to unity. This may be accomplished by setting $\Lambda^{(k)}_{kk} = 0$ for each k. Although this results in non-zero diagonal error terms $E_{kk}$, the error terms may be compensated in practice by automatic adaptations of equalizer coefficients in the receiver.

Example embodiments being thus described, it will be obvious that the same may be varied in many ways. Such variations are not to be regarded as a departure from the spirit and scope of example embodiments, and all such modifications as would be obvious to one skilled in the art are intended to be included within the scope of the claims.

The invention claimed is:

1. A method comprising:
   obtaining, by at least one processor, a crosstalk channel matrix;
   determining, by the at least one processor, a power controlling matrix, the power controlling matrix for regulating powers corresponding to a plurality of active communication lines;
   directly applying, by the at least one processor, the power controlling matrix to the crosstalk channel matrix;
   determining, by the at least one processor, a vectoring matrix based on the directly applying the power controlling matrix to the crosstalk channel matrix; and
   generating, by the at least one processor, vectored signals using the vectoring matrix for communication of data over the plurality of active communication lines.

2. The method of claim 1, further comprising:
   determining the power controlling matrix such that a strength of a product of the power controlling matrix and the crosstalk channel matrix is less than a threshold, wherein the vectoring matrix is a pre-coding matrix and the crosstalk channel matrix is a downstream crosstalk channel matrix.

3. The method of claim 2, wherein
   the power controlling matrix is a diagonal matrix, and
   entries of the diagonal matrix corresponding to a portion of the active communication lines are less than 1, and
   entries of the diagonal matrix corresponding to a remaining portion of the plurality of active communication lines are equal to 1.

4. The method of claim 3, further comprising:
   constraining the powers corresponding to the portion of the active communication lines.

5. The method of claim 1, further comprising:
   determining the power controlling matrix by iteratively updating diagonal entries of the power controlling matrix.

6. The method of claim 5, the iterative updating of the diagonal entries of the power controlling matrix includes,
   determining an initial compensation matrix subject to a threshold, and
   for each iteration in the iterative updating,
      determining an error matrix based on a corresponding compensation matrix,
      determining, for each row of the corresponding compensation matrix, a row power,
      determining the diagonal entries of the power controlling matrix based on each determined row power, and
      updating the corresponding compensation matrix based on the determined power controlling matrix, the updated compensation matrix being used as a compensation matrix for a next iteration in the iterative updating.

7. The method of claim 1, further comprising:
   determining the power controlling matrix such that a strength of a product of the power controlling matrix and the crosstalk channel matrix is less than a threshold, wherein the vectoring matrix is a post-coding matrix and the crosstalk channel matrix is an upstream crosstalk channel matrix.

8. The method of claim 7, wherein
   the power controlling matrix is a diagonal matrix, and
   entries of the diagonal matrix corresponding to a portion of the plurality of active communication lines are less than 1, and
   entries of the diagonal matrix corresponding to a remaining portion of the plurality of active communication lines are equal to 1.

9. The method of claim 8, further comprising:
   constraining the powers corresponding to the portion of the active communication lines.

10. The method of claim 1, further comprising:
    obtaining a channel matrix, wherein the obtaining the crosstalk channel matrix obtains off-diagonal elements of the channel matrix, the crosstalk channel matrix being off-diagonal elements of the channel matrix.

11. The method of claim 1, wherein the determining the vectoring matrix includes,
  determining a modified channel matrix based on the directly applying the power controlling matrix to the crosstalk channel matrix, and
  inverting the modified channel matrix, the inverted modified channel matrix being the vectoring matrix.

12. The method of claim 11, wherein the determining the vectoring matrix determines the vectoring matrix as
  wherein $\Lambda$ is the power controlling matrix, G is the crosstalk channel matrix, I is an identity matrix and C is the vectoring matrix.

13. A device comprising:
  at least one processor configured to,
    obtain a crosstalk channel matrix;
    determine a power controlling matrix, the power controlling matrix for regulating powers corresponding to a plurality of active communication lines;
    directly apply the power controlling matrix to the crosstalk channel matrix;
    determine a vectoring matrix based on the directly applying the power controlling matrix to the crosstalk channel matrix; and
    generate vectored signals using the vectoring matrix for communication over the plurality of active communication lines.

14. The device of claim 13, wherein the at least one processor is further configured to determine the power controlling matrix such that a strength of a product of the power controlling matrix and the crosstalk channel matrix is less than a threshold, wherein the vectoring matrix is a pre-coding matrix and the crosstalk channel matrix is a downstream crosstalk channel matrix.

15. The device of claim 14, wherein
  the power controlling matrix is a diagonal matrix, and
  entries of the diagonal matrix corresponding to a portion of the active communication lines are less than 1, and
  entries of the diagonal matrix corresponding to a remaining portion of the plurality of active communication lines are equal to 1.

16. The device of claim 15, wherein the at least one processor is configured to constrain the powers corresponding to the portion of the active communication lines.

17. The device of claim 13, wherein the at least one processor is further configured to determine the power controlling matrix by iteratively updating diagonal entries of the power controlling matrix.

18. The device of claim 17, wherein the at least one processor is configured to iteratively update the diagonal entries of the power controlling matrix by,
  determining an initial compensation matrix subject to a threshold, and
  for each iteration in the iterative updating,
    determining an error matrix based on a corresponding compensation matrix,
    determining, for each row of the corresponding compensation matrix, a row power,
    determining the diagonal entries of the power controlling matrix based on each determined row power, and
    updating the corresponding compensation matrix based on the determined power controlling matrix, the updated compensation matrix being used as a compensation matrix for a next iteration in the iterative updating.

19. The device of claim 13, wherein the at least one processor is configured to determine the power controlling matrix such that a strength of a product of the power controlling matrix and the crosstalk channel matrix is less than a threshold, wherein the vectoring matrix is a post-coding matrix and the crosstalk channel matrix is an upstream crosstalk channel matrix.

20. The device of claim 19, wherein
  the power controlling matrix is a diagonal matrix, and
  entries of the diagonal matrix corresponding to a portion of the plurality of active communication lines are less than 1, and
  entries of the diagonal matrix corresponding to a remaining portion of the plurality of active communication lines are equal to 1.

21. The device of claim 20, wherein the at least one processor is configured to constrain the powers corresponding to the portion of the active communication lines.

22. The device of claim 13, wherein the processor is configured to obtain a channel matrix and obtain off-diagonal elements of the channel matrix as the crosstalk channel matrix.

23. The device of claim 13, wherein the processor is configured to,
  determine a modified channel matrix based on the directly applying the power controlling matrix to the crosstalk channel matrix, and
  invert the modified channel matrix, the inverted modified channel matrix being the vectoring matrix.

24. The device of claim 23, wherein the processor is configured to determine the vectoring matrix as $$C=(I+\Lambda G)^{-1}$$

wherein $\Lambda$ is the power controlling matrix, G is the crosstalk channel matrix, I is an identity matrix and C is the vectoring matrix.

* * * * *